United States Patent
Johnson (10) Patent No.: US 9,553,935 B2
(45) Date of Patent: Jan. 24, 2017

(54) MECHANISM FOR CONFIGURING SERVICE ENDPOINTS IN NATIVE CLIENT APPLICATIONS AT RUNTIME

(71) Applicant: Oracle International Corporation, Redwood Shores, CA (US)

(72) Inventor: Mark A. Johnson, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 459 days.

(21) Appl. No.: 13/842,808

(22) Filed: Mar. 15, 2013

(65) Prior Publication Data
US 2014/0115035 A1 Apr. 24, 2014

Related U.S. Application Data

(60) Provisional application No. 61/707,933, filed on Sep. 29, 2012.

(51) Int. Cl.
*G06F 15/16* (2006.01)
*H04L 29/08* (2006.01)
*H04L 12/06* (2006.01)

(52) U.S. Cl.
CPC .............. *H04L 67/16* (2013.01); *H04L 67/34* (2013.01); *H04L 12/06* (2013.01)

(58) Field of Classification Search
CPC .......... H04L 12/06; H04L 29/42; H04L 29/06; G06F 17/30; G06Q 30/0621
USPC ........................................................ 709/203
See application file for complete search history.

(56) References Cited

U.S. PATENT DOCUMENTS

| | | | |
|---|---|---|---|
| 6,298,451 B1 * | 10/2001 | Lin | 714/4.2 |
| 6,560,604 B1 * | 5/2003 | Fascenda | 707/999.01 |
| 7,107,543 B2 * | 9/2006 | Berry et al. | 715/749 |
| 7,257,623 B2 * | 8/2007 | Viavant et al. | 709/220 |
| 7,716,492 B1 | 5/2010 | Saulpaugh et al. | |
| 7,940,722 B1 * | 5/2011 | Rosenberg et al. | 370/329 |
| 8,090,874 B2 * | 1/2012 | Panasyuk | G06F 21/31 709/219 |
| 8,126,987 B2 * | 2/2012 | Chopra | G06Q 30/02 709/217 |

(Continued)

OTHER PUBLICATIONS

Mullet, Dianna et al; "Managing IMAP" obtained at https://books.google.com/books?d=ZljG1e7zHCkC&printsec=frontcover&dq=Managing=IMAP&hl=en&sa=X&ved=0ahUKEwjWt42-MvrbKAhVBzGMKHdv7DK8Q6AEIJDAA#v=onepage&q=Managing%20IMAP&f=false; downloaded Jan. 19, 2016; pp. 42-44.

*Primary Examiner* — Dhairya A Patel
(74) *Attorney, Agent, or Firm* — Trellis IP Law Group, PC (57) ABSTRACT

A system and method for facilitating efficient interaction between a client device and a server. An example method includes receiving at a server, a request for server configuration information sent to the server by a client device, and then employing a first web service in communication with the server to convey configuration information about a server to a client device in response to the request message received therefrom by the server. The configuration information includes information pertaining to known capabilities that may be offered by the server to the client device. Generally, embodiments described herein provide various features for facilitating configuring service endpoints in native client applications at runtime, thereby enabling implementation of changes to server-side components that a client application invokes or communicates with, without needing to change the client application.

19 Claims, 5 Drawing Sheets

(56) References Cited

U.S. PATENT DOCUMENTS

| | | | |
|---|---|---|---|
| 8,184,614 B2* | 5/2012 | Beyda | G06F 9/4403 |
| | | | 370/352 |
| 8,239,467 B2* | 8/2012 | Lee et al. | 709/206 |
| 8,260,946 B1 | 9/2012 | Ruppert et al. | |
| 8,595,810 B1* | 11/2013 | Ben Ayed | H04L 63/0815 |
| | | | 713/168 |
| 2002/0112085 A1* | 8/2002 | Berg | H04L 29/06 |
| | | | 709/250 |
| 2005/0192984 A1* | 9/2005 | Shenfield et al. | 707/100 |
| 2007/0233696 A1* | 10/2007 | Ishihara | G06F 9/54 |
| 2009/0323675 A1* | 12/2009 | Raza | H04M 7/003 |
| | | | 370/352 |

\* cited by examiner

FIG. 3 Con1

FIG. 4

MECHANISM FOR CONFIGURING SERVICE ENDPOINTS IN NATIVE CLIENT APPLICATIONS AT RUNTIME

CROSS REFERENCES TO RELATED APPLICATIONS

This application claims priority from U.S. Provisional Patent Application Ser. No. 61/707,933, entitled A MECHANISM FOR CONFIGURING SERVICE ENDPOINTS IN NATIVE CLIENT APPLICATIONS AT RUNTIME, filed on Sep. 25, 2012, which is hereby incorporated by reference as if set forth in full in this application for all purposes.

BACKGROUND

The present application relates to software and more specifically to systems and methods for facilitating updating client-side software to account for changes made to server-side software that is called by client-side software.

Software for facilitating configuring and running applications that employ service processes are employed in various demanding applications, including Enterprise Resource Planning (ERP), scientific distributed computing applications, and so on. Such applications often demand easily configurable, scalable, and portable Service Oriented Architectures (SOAs) that can be efficiently and accurately customized and deployed in various networked computing environments.

Configurable and readily updatable client-side software is particularly important in applications that employ one or more server-side components, such as web services.

Increasing popularity of mobile devices has paralleled increasing demand for rich software features that leverage interactions between native client applications and server-side applications or application components, such as Web services. Generally, in such implementations, changes to the back end, i.e., the server-side application components, often require redistribution (e.g., reshipping) of new client-side software to account for the back end changes. However, delivering modifications to the native client application after release is often costly and time consuming.

SUMMARY

An example method facilitates efficient interaction between a client device and a server, including one or more services or capabilities associated with the server and to be leveraged, i.e., used by an application running on the client device. The example method includes receiving at a server, a request for server configuration information sent to the server by a client device, and then employing a first web service in communication with the server to convey configuration information about a server to a client device in response to the request message received therefrom by the server, wherein the configuration information includes information pertaining to known capabilities that may be offered by the server to the client device.

In a more specific embodiment, the configuration information further includes instructions indicating how the client device may access or use the capabilities of the server. The server communicates with one or more additional web services to be called by software running on the client device after the client device calls the first web service. The one or more additional web services are characterized by one or more web service addresses. The one or more additional web services may include one or more web services hosted on a server that is a different server than the server receiving the request for server configuration information from the client.

The configuration information may include service endpoint mappings that map one or more relative network service addresses of a web service to be called by the client device, to one or more physical network address of the web service to be called by the client device.

Hence, various embodiments described herein provide various features for facilitating configuring service endpoints in native client applications at runtime, and thereby facilitating efficient interaction between a client device and a server. Server configuration information, including information about known server capabilities, i.e., features, and information about how a client may access the capabilities may be provided to a native client device in response to a request from an application running thereon.

By providing a known capabilities service that describes the native capabilities supported by the server and web services in communication therewith that are to be used by the native client, the server can deliver configuration information about what capabilities the native client can use/leverage and how those capabilities can be accessed on the server at runtime.

This enables the development organization to make modifications to service definitions or fully retire features without the need to distribute a new version of the client application. Furthermore, by providing a loose coupling between the client and server regarding service contracts, changes to the service contracts and supported features can be communicated to the native client without requiring the distribution of a new version of the native client application.

A further understanding of the nature and the advantages of particular embodiments disclosed herein may be realized by reference of the remaining portions of the specification and the attached drawings.

DETAILED DESCRIPTION OF EMBODIMENTS

Historically, a significant challenge with native client applications has been delivering modifications to the native client application after release as a new version of the application must be distributed. Certain embodiments discussed herein address such a challenge, in part by providing a known capabilities service that describes the native capabilities supported by the server and that are leveraged by the native client, as discussed more fully below.

Figure 1:
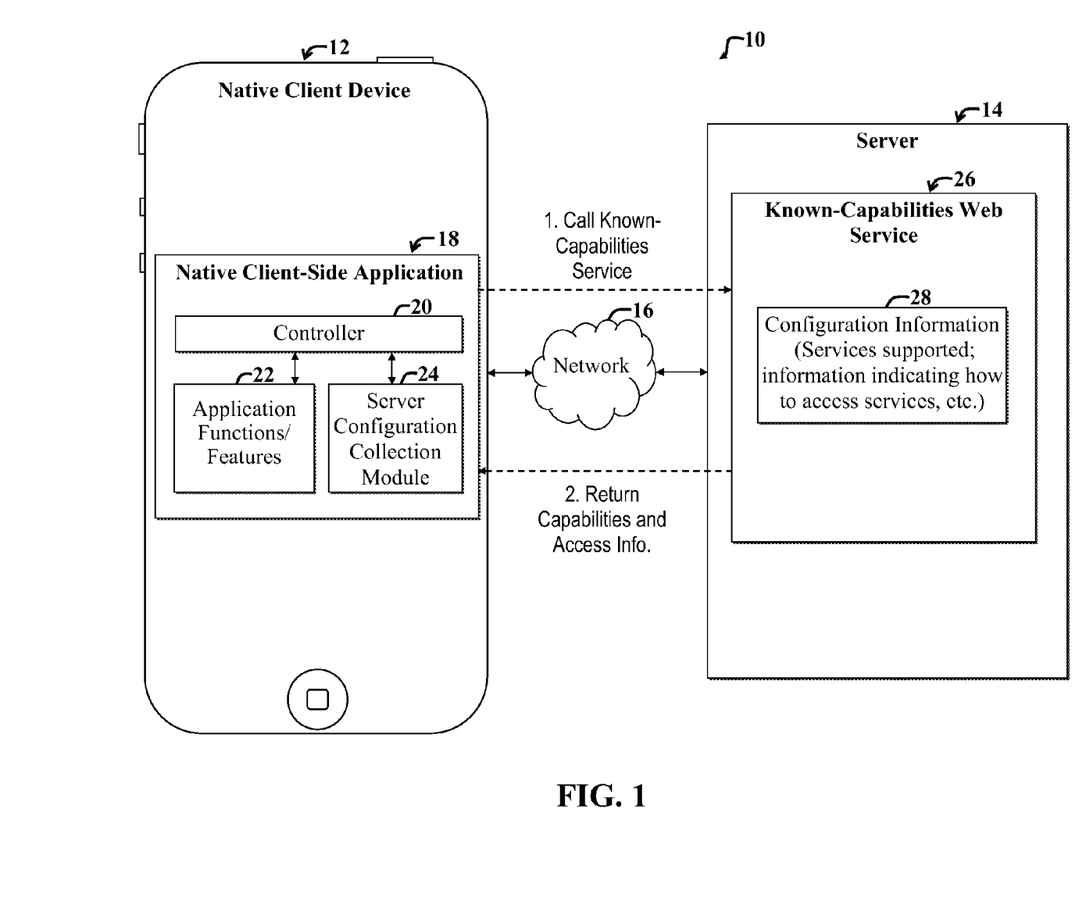
FIG. 1 is a diagram illustrating a first example system for configuring service endpoints in native client applications at runtime in accordance with a first embodiment.

For clarity, certain well-known components, such as hard drives, processors, operating systems, power supplies, routers, Internet Service Providers (ISPs), and so on, have been omitted from FIG. 1. However, those skilled in the art with access to the present teachings will know which components to implement and how to implement them to meet the needs of a given implementation.

FIG. 1 is a diagram illustrating a first example system 10 for configuring service endpoints (e.g., as represented by a native client device 12 and server 14 intercommunicating via a network 16, such as the Internet) in native client applications (such as a native client-side application 18) at runtime. The native client device 12 includes the native client-side application 18, also called the native client application, which communicates with the server 14 via the network 16.

For the purposes of the present discussion, a native client may any application written in native code and which communicates with a server over a network.

The server 14 includes a known-capabilities web service 26, which as access to server configuration information 28. The server configuration information 28 includes information specifying which capabilities may be provided to a client via the server, as well as information pertaining to how a client device is to use the capabilities. For the purposes of the present discussion, capabilities may refer to any features, services, or other resources that the server 14 may make available to the native client device 12.

The native client-side application 18, i.e., native client application includes a controller 20, which includes computer code for interfacing and coordinating various application functions and code supporting various application features with server configuration information retrieved from the server 14 in response to a configuration request message constructed via computer code running on a server configuration collection module 24.

Hence, the system 10 is adapted to employ the known-capabilities web service 26, also called a capabilities service, to selectively deliver information to a native client, e.g., the client device 12. The configuration information describes what capabilities the server supports and how those capabilities can be accessed by the client device 12.

The capabilities service 26 is the one service endpoint the native client application 18 is aware of prior to runtime. When the native client application 18 starts, the native client application 18 calls the capabilities service 26 to determine what capabilities the server 14 supports and the configuration information 28 describing how the native client application 18 can access each capability.

The native client application 18 evaluates the information 28 regarding capabilities supported by the server 14; stores the information in memory; and uses the configuration information 28 when contacting the server 14 for service calls related to the capability.

If the native client application 18 can support a capability, but the capabilities service 26 indicates that the server 14 does not support that capability, the native client application 18 can disable or hide the feature from the user.

Figure 2:
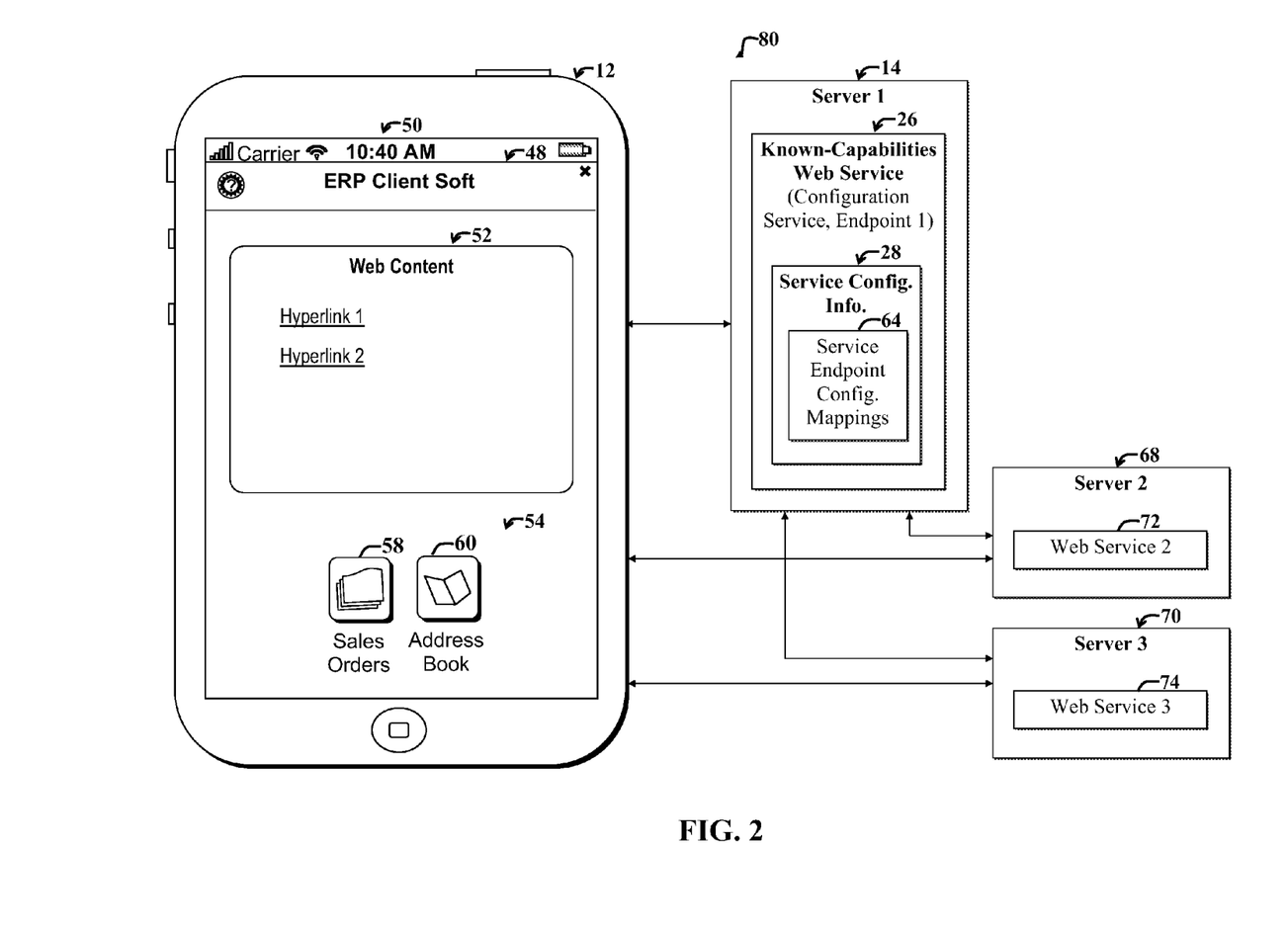
FIG. 2 is a diagram illustrating an alternative depiction of the embodiment of the example system of FIG. 1.

FIG. 2 is a diagram illustrating an alternative depiction 80 of the embodiment of the example system 10 of FIG. 1. The system 80 of FIG. 2 shows the client device 12 displaying a client-side user interface display screen 48 displayed on a client display 50, such as a touch screen display.

For the purposes of the present discussion, a user interface display screen may be any software-generated depiction presented on a display, such as the touch screen display 50. Examples of depictions include windows, dialog boxes, displayed tables, and any other graphical user interface features, such as user interface controls, presented to a user via software, such as a browser. User interface display screens may include various graphical depictions, including visualizations, such as graphs, charts, diagrams, tables, and so on.

With reference to FIGS. 1 and 2, the client user interface display screen 48 is generated and rendered via the native client-side application 18 of FIG. 1. The example user interface display screen 48 includes an example web client section 52, which includes web-based content, such as HTML content retrieved by the underlying client application from a server.

Additional user interface elements 54 include a sales-orders icon 58 and an address-book icon 60. Each of the user interface elements 54 represents a user interface control that is associated with one or more actions, such as retrieving a user's records of sales orders and retrieving address book information from a server. Each of the one or more actions are associated with one or more web services used to implement the actions, such as a second web service 72 hosted on a second server 68, and a third web service 74 hosted on a third server 70.

In the present example embodiment, the first server 14 acts as a configuration server, also called a known-capabilities server, since it hosts the known-capabilities web service 26. The service configuration information 28 includes service endpoint configuration mappings that include information for mapping any relative service reference addresses pertaining to the web services 72, 70 stored on the client device 12 to physical or actual network web addresses, which may be expressed as Uniform Resource Locators (URLs).

In an example operative scenario, when a user selects the sales orders user interface element 58, the underlying native client-side application employs a URL that specifies the endpoint (i.e., network address) associated with the known-capabilities web service 26. The URL may contain additional information pertaining to the client application that is calling the known-capabilities web service 26 to facilitate enabling the known-capabilities web service 26 to deliver configuration information (e.g., parameters, physical endpoint address information, and so on) to the client 12 to enable the client to call the web service (e.g., the second web service 72) used to retrieve the user's sales orders.

Note that web services discussed herein may be implemented via software services other than web services, without departing from the scope of the present teachings.

For the purposes of the present discussion, a software service, such as a web service, may be any computer code that is adapted to be called by an application (e.g., an application running on a Service Oriented Architecture (SOA) server cluster) whose code is stored in a separate location (e.g., on another computer or memory storage location or device) from the software service. Generally, software services provide functionality, e.g., capabilities, that may be reused by different applications or processes (that may be distributed across a network), which access the functionality via a predetermined interface, e.g., as specified via middleware, and consistent with a service description.

The term "functionality" may refer to or include any function or set of functions, actions, operations, mechanisms for performing a task via software and may further include software and/or hardware features that perform or facilitate performing or implementing one or more functions, capabilities, or tasks.

A process may be any sequence of one or more steps or tasks performed by a computer in accordance with computer code. Hence, execution of a function of an application may involve implementing a process.

Note that the various servers 14, 68, 70 may be implemented as SOA servers. For the purposes of the present discussion, an SOA server may be any server that is adapted to facilitate providing services accessible to one or more client computers coupled to a network. In general, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server.

Hence, the embodiments of FIGS. 1-2 may reduce effort needed to configure a client application to access web services. In certain implementations, a given client application may call many different services. Conventionally, a client application would need to be configured and updated with physical endpoint address information and other parameters for each web service to be used by the client application. This was particularly problematic when changes or updates were made to web service parameters or endpoint address information, since a client application that was not properly updated may no longer be able to access the web services.

By configuring client-side applications to initially call the known-capabilities web service 26 to automatically retrieve service configuration information may greatly reduce client-side configuration complexity and may facilitate automatically propagating back end web service changes to the client application via configuration information provided in an initial client call to the known-capabilities web service 26.

Figure 3:
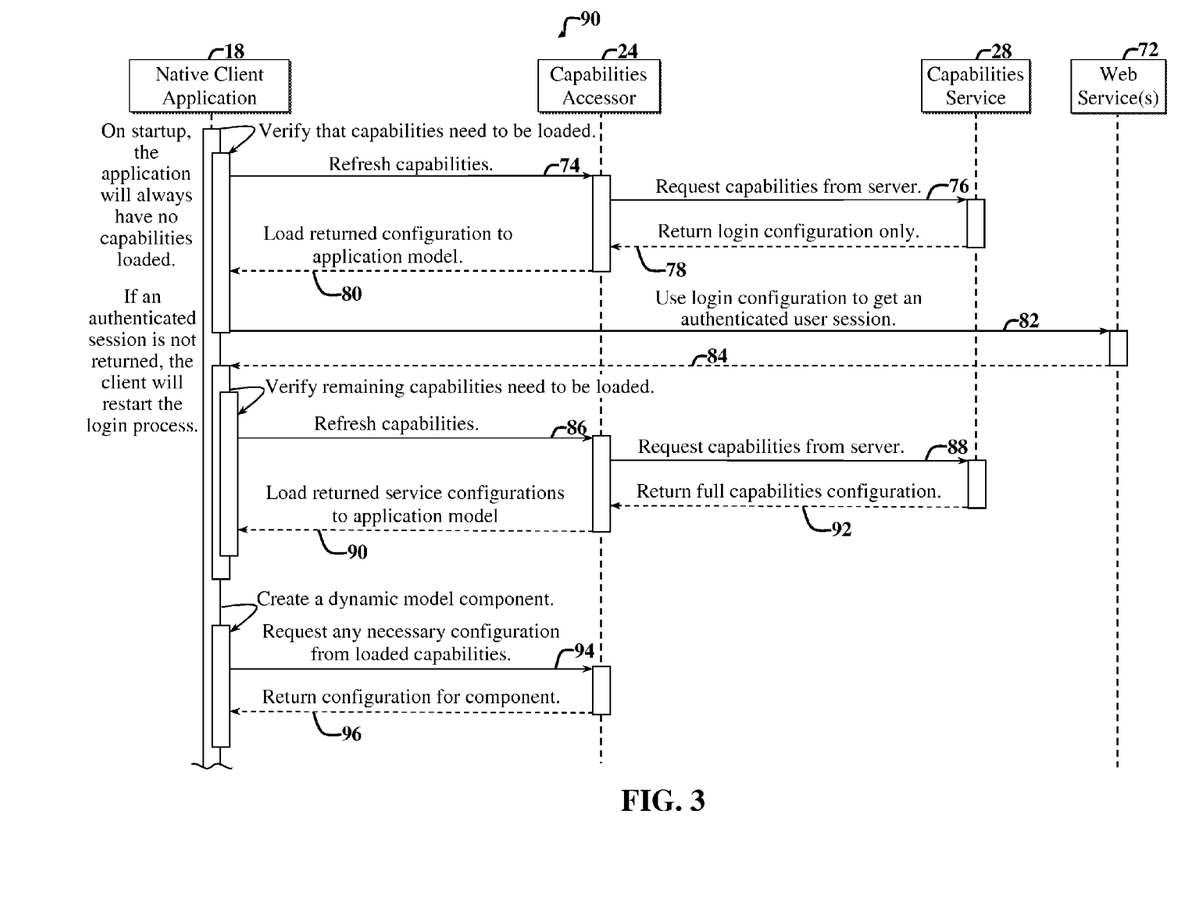
FIG. 3 is a Ping-Pong diagram illustrating example communications occurring between a native client application, a capabilities accessor, a capabilities service, and a server-side application in accordance with the embodiment of FIGS. 1-2.

FIG. 3 is a Ping-Pong diagram 90 illustrating example communications 74-106 occurring between a native client application 18, a capabilities accessor 24, a capabilities service 28, and a server-side application, e.g., a web service to be called by the native client application 18, in accordance with the embodiments of FIGS. 1-2.

Upon startup of the client-side application 18, the client-side application will have no capabilities, i.e., services, loaded. An initial call 74 is made to the capabilities assessor module 24 (which equivalent to the server configuration collection module 24 of FIG. 1) to refresh information identifying capabilities of the native client application.

The capabilities accessor 24 then sends a request for capabilities 76 information to the capabilities service 28, which initially responds by returning login configuration information only 78 to the capabilities accessor 24. The capabilities accessor 24 then forwards the configuration information 80 to the native client application 18, which is loaded to the application model of the native client-side application 18.

The native client-side application then forwards login configuration information 82 supplied by a user to the web service 72 which responds via a message 84 indicating whether or not an authenticated session is to begin. If the user's supplied login information is not sufficient to authenticate the user for access to the web service, then the native client-side application may restart the login process.

If the login is successful, then the native client-side application 18 sends a refresh-capabilities message 86 to the capabilities accessor 24, which then issues a request 88 for capabilities from the capabilities service 28. The capabilities service 28 then responds by returning full capabilities configuration information 92 to the capabilities accessor 24. The capabilities accessor 24 then issues a message 90 to the native client-side application 18 the triggers loading of returned service configurations to the native client application model.

Subsequently, the native client application 18 creates a dynamic model component and then issues another request 94 to the capabilities accessor 24 for any necessary configuration information pertaining to loaded capabilities. The capabilities accessor 24 then returns configuration information 96 for any applicable components to the native client application 18.

Subsequent messages 98-106 include example messages exchanged between the native client application 18 and the web service 72 during a logout process. The example message exchange of the Ping-Pong diagram 90 completes when the native client application 18 issues a message to the capabilities accessor 24 to clear all loaded configurations for the native client application.

Figure 4:
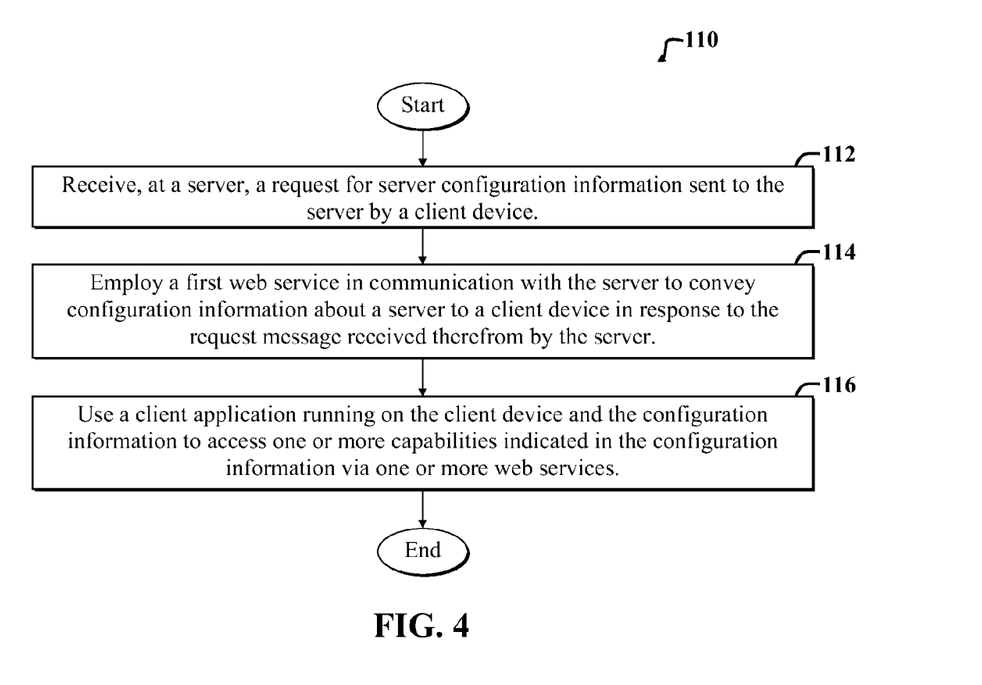
FIG. 4 is a flow diagram of an example method adapted for use with the embodiments of FIGS. 1-3.

FIG. 4 is a flow diagram of an example method 110 adapted for use with the embodiments of FIGS. 1-3. The example method 110 is adapted to facilitate efficient interaction between a client device and a server, thereby facilitating configuring service endpoints in native client applications at runtime, and thereby enabling implementation of changes to server-side components that a client application invokes or communicates with, without needing to change the client application.

The example method 110 includes a first step 112, which involves receiving at a server, a request for server configuration information sent to the server by a client device.

A second step 114 includes employing a first web service in communication with the server to convey configuration information about a server to a client device in response to the request message received therefrom by the server. The configuration information may include, for example, information pertaining to known capabilities that may be offered by the server to the client device.

A third step 116 includes using a client application running on the client device and the configuration information to access one or more capabilities indicated in the configuration information via one or more web services.

Examples of additional steps that may be included in the example method 110 include providing instructions in the configuration information that indicate how the client device may access or use the capabilities of the server. The server may communicate with one or more additional web services to be called by software (e.g., a client application) running on the client device after the client device calls the first web service.

The one or more additional web services may be characterized by one or more web service addresses. The configuration information may include service endpoint mappings that map one or more relative network service addresses of a web service to be called by the client device, to one or more physical network address of the web service to be called by the client device.

Although the description has been described with respect to particular embodiments thereof, these particular embodiments are merely illustrative, and not restrictive. For example, while embodiments are discussed with respect to native client-side applications and a known-capabilities web service, embodiments are not limited thereto. For example client-side applications that are not completely native may use configuration information from a server to facilitate disabling or hiding certain features from a user, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating efficient interaction between a client device and a server, the method comprising:
receiving, at a server, a request for server configuration information, wherein the request is sent to the server by the client device;
employing a first web service in communication with the server to convey configuration information to the client device in response to the request, wherein the configuration information includes information pertaining to known capabilities that may be offered by the server to the client device and information pertaining to one or more of at least one first change in web service parameters and at least one second change to web service addresses; and
enabling the client device to access the known capabilities at runtime based on one or more of the at least one first change and at least one second change, wherein access of the known capabilities is independent of updates to a client application running on the client device,
wherein the configuration information further includes instructions indicating how the client device may access or use the known capabilities of the server, and wherein the method further includes using a client application running on the client device and the configuration information to access one or more capabilities indicated in the configuration information via one or more web services,
wherein the server communicates with one or more additional web services to be called by software running on the client device after the client device calls the first web service, and wherein the one or more additional web services are characterized by one or more web service addresses,
wherein the one or more additional web services include one or more web services hosted on a server that is a different server than the server receiving the request for server configuration information from the client device,
wherein the configuration information includes service endpoint mappings that map one or more relative network service addresses of a web service to be called by the client device to one or more physical network addresses of the web service to be called by the client device, and
wherein the method further comprises:
employing the first web service to maintain web service address information, as part of the configuration information, wherein the web service address information includes web service addresses pertaining to the one or more additional web services;
forwarding the web service address information to the client device in response to communications initiated by the client device with the server;
forwarding configuration information pertaining to all web services that a client application running on the client device will call as part of one or more operations initiated by the client device, in response to the client application accessing the first web service via a uniform resource locator (URL) identifying a network address of the first web service, wherein the configuration information includes information pertaining to one or more service methods used by the one or more additional web services, wherein the configuration information further includes information indicating one or more web service parameters to be input to the one or more web services when the client application calls the one or more web services, wherein the client application is adapted to facilitate displaying a user interface that includes one or more user interface (UI) elements that are adapted to call the one or more services, for which configuration information has been received by the client application from the server, in response to user selection of the one or more UI elements;
associating a URL received by the server from the client application with a set of one or more web services;
configuring the client application to communicate with the one or more web services based on configuration information pertaining to the one or more web, services that is forwarded from the server to the client application in response to receipt by the server of a URL identifying a configuration service for use with the client application;
sending a signal from the server to the client device that is effective to trigger disabling on the client device of one or more capabilities or features supported by the client device but not indicated, by the configuration information, as being supported by the server;

employing the client device to store configuration information from the server in memory on the client device, and using the stored configuration information in, the request from the client device to the server when an application of the client device requests use of a capability of the server;

employing a capabilities assessor module running on the client device to verify capabilities and associated web services to be loaded by a client application running on the client device; and employing the capabilities assessor module to send a request for capabilities information from the server, wherein the capabilities information includes configuration information pertaining to web services associated with capabilities verified by the capabilities assessor module.

2. The method of claim 1, wherein the server communicates with one or more additional web services to be called by software running on the client device after the client device calls the first web service, and wherein the one or more additional web services are characterized by one or more web service addresses.

3. The method of claim 2, wherein the one or more additional web services include one or more web services hosted on a server that is a different server than the server receiving the request for server configuration information from the client device.

4. The method of claim 3, wherein the configuration information includes service endpoint mappings that map one or more relative network service addresses of a web service to be called by the client device to one or more physical network addresses of the web service to be called by the client device.

5. The method of claim 2, further including employing the first web service to maintain web service address information, as part of the configuration information, wherein the web service address information includes web service addresses pertaining to the one or more additional web services.

6. The method of claim 5, further including forwarding the web service address information to the client device in response to communications initiated by the client device with the server.

7. The method of claim 5, further including forwarding configuration information pertaining to all web services that a client application running on the client device will call as part of one or more operations initiated by the client device, in response to the client application accessing the first web service via a uniform resource locator (URL) identifying a network address of the first web service.

8. The method of claim 7, further including associating a URL received by the server from the client application with a set of one or more web services.

9. The method of claim 8, further including configuring the client application to communicate with the one or more web services based on configuration information pertaining to the one or more web services that is forwarded from the server to the client application in response to receipt by the server of a URL identifying a configuration service for use with the client application.

10. The method of claim 7, wherein the configuration information includes information pertaining to one or more service methods used by the one or more additional web services.

11. The method of claim 7, wherein the configuration information further includes information indicating one or more web service parameters to be input to the one or more web services when the client application calls the one or more web services.

12. The method of claim 7, wherein the client application is adapted to facilitate displaying a user interface that includes one or more user interface (UI) elements that are adapted to call the one or more services, for which the configuration information has been received by the client application from the server, in response to user selection of the one or more UI elements.

13. The method of claim 1, further including sending a signal from the server to the client device that is effective to trigger disabling on the client device of one or more capabilities or features supported by the client device but not indicated, by the configuration information, as being supported by the server.

14. The method of claim 13, further including employing the client device to store configuration information from the server in memory on the client device, and using the stored configuration information in the request from the client device to the server when an application of the client device requests use of a capability of the server.

15. The method of claim 1, further including employing a capabilities assessor module running on the client device to verify capabilities and associated web services to be loaded by a client application running on the client device.

16. The method of claim 15, further including employing the capabilities assessor module to send a request for capabilities information from the server.

17. The method of claim 16, wherein the capabilities information includes configuration information pertaining to web services associated with capabilities verified by the capabilities assessor module.

18. An apparatus comprising:
a digital processor coupled to a display;
a non-transitory processor-readable storage device, wherein the non-transitory processor-readable storage device includes one or more instructions executable by the digital processor to perform acts comprising:
receiving, at a server, a request for server configuration information, wherein the request is sent to the server by a client device;
employing a first web service in communication with the server to convey configuration information to the client device in response to the request, wherein the configuration information includes information pertaining to known capabilities that may be offered by the server to the client device and information pertaining to one or more of at least one first change in web service parameters and at least one second change to web service addresses; and
enabling the client device to access the known capabilities at runtime based on one or more of the at least one first change and at least one second change, wherein access of the known capabilities is independent of updates to a client application running on the client device,
wherein the configuration information further includes instructions indicating how the client device may access or use the known capabilities of the server, and wherein the method further includes using a client application running on the client device and the configuration information to access one or more capabilities indicated in the configuration information via one or more web services, wherein the server communicates with one or more additional web services to be called by software running on the client device after the client device calls the first web service, and wherein the one or more additional web services are characterized by one or more web service addresses, wherein the one or more additional web services include one or more web services hosted on a server that is a different server than the server receiving the request for server configuration information from the client device, wherein the configuration information includes service endpoint mappings that map one or more relative network service addresses of a web service to be called by the client device to one or more physical network addresses of the web service to be called by the client device, and wherein the method further comprises:

employing the first web service to maintain web service address information, as part of the configuration information, wherein the web service address information includes web service addresses pertaining to the one or more additional web services;

forwarding the web service address information to the client device in response to communications initiated by the client device with the server;

forwarding configuration information pertaining to all web services that a client application running on the client device will call as part of one or more operations initiated by the client device, in response to the client application accessing the first web service via a uniform resource locator (URL) identifying a network address of the first web service, wherein the configuration information includes information pertaining to one or more service methods used by the one or more additional web services, wherein the configuration information further includes information indicating one or more web service parameters to be input to the one or more web services when the client application calls the one or more web services, wherein the client application is adapted to facilitate displaying a user interface that includes one or more user interface (UI) elements that are adapted to call the one or more services, for which configuration information has been received by the client application from the server, in response to user selection of the one or more UI elements;

associating a URL received by the server from the client application with a set of one or more web services;

configuring the client application to communicate with the one or more web services based on configuration information pertaining to the one or more web services that is forwarded from the server to the client application in response to receipt by the server of a URL identifying a configuration service for use with the client application;

sending a signal from the server to the client device that is effective to trigger disabling on the client device of one or more capabilities or features supported by the client device but not indicated, by the configuration information, as being supported by the server;

employing the client device to store configuration information from the server in memory on the client device, and using the stored configuration information in the request from the client device to the server when an application of the client device requests use of a capability of the server;

employing a capabilities assessor module running on the client device to verify capabilities and associated web services to be loaded by a client application running on the client device; and employing the capabilities assessor module to send a request for capabilities information from the server, wherein the capabilities information includes configuration information pertaining to web services associated with capabilities verified by the capabilities assessor module.

19. A non-transitory processor-readable storage device including instructions executable by a digital processor, the processor-readable storage device including one or more instructions for:

receiving, at a server, a request for server configuration information, wherein the request is sent to the server by a client device;

employing a first web service in communication with the server to convey configuration information to the client device in response to the request, wherein the configuration information includes information pertaining to known capabilities that may be offered by the server to the client device and information pertaining to one or more of at least one first change in web service parameters and at least one second change to web service addresses; and enabling the client device to access the known capabilities at runtime based on one or more of the at least one first change and at least one second change, wherein access of the known capabilities is independent of updates to a client application running on the client device, wherein the configuration information further includes instructions indicating how the client device may access or use the known capabilities of the server, and wherein the method further includes using a client application running on the client device and the configuration information to access one or more capabilities indicated in the configuration information via one or more web services, wherein the server communicates with one or more additional web services to be called by software running on the client device after the client device calls the first web service, and wherein the one or more additional web services are characterized by one or more web service addresses, wherein the one or more additional web services include one or more web services hosted on a server that is a different server than the server receiving the request for server configuration information from the client device, wherein the configuration information includes service endpoint mappings that map one or more relative network service addresses of a web service to be called by the client device to one or more physical network addresses of the web service to be called by the client device, and wherein the method further comprises:

employing the first web service to maintain web service address information, as part of the configuration information, wherein the web service address information includes web service addresses pertaining to the one or more additional web services;

forwarding the web service address information to the client device in response to communications initiated by the client device with the server;

forwarding configuration information pertaining to all web services that a client application running on the client device will call as part of one or more operations initiated by the client device, in response to the client application accessing the first web service via a uniform resource locator (URL) identifying a network address of the first web service, wherein the configuration information includes information pertaining to one or more service methods used by the one or more additional web services, wherein the configuration information further includes information indicating one or more web service parameters to be input to the one or more web services when the client application calls the one or more web services, wherein the client application is adapted to facilitate displaying a user interface that includes one or more user interface (UI) elements that are adapted to call the one or more services, for which configuration information has been received by the client application from the server, in response to user selection of the one or more UI elements;

associating a URL received by the server from the client application with a set of one or more web services;

configuring the client application to communicate with the one or more web services based on configuration information pertaining to the one or more web services that is forwarded from the server to the client application in response to receipt by the server of a URL identifying a configuration service for use with the client application;

sending a signal from the server to the client device that is effective to trigger disabling on the client device of one or more capabilities or features supported by the client device but not indicated, by the configuration information, as being supported by the server;

employing the client device to store configuration information from the server in memory on the client device, and using the stored configuration information in the request from the client device to the server when an application of the client device requests use of a capability of the server;

employing a capabilities assessor module running on the client device to verify capabilities and associated web services to be loaded by a client application running on the client device; and employing the capabilities assessor module to send a request for capabilities information from the server, wherein the capabilities information includes configuration information pertaining to web services associated with capabilities verified by the capabilities assessor module.

* * * * *

UNITED STATES PATENT AND TRADEMARK OFFICE
CERTIFICATE OF CORRECTION

PATENT NO. : 9,553,935 B2
APPLICATION NO. : 13/842808
DATED : January 24, 2017
INVENTOR(S) : Johnson It is certified that error appears in the above-identified patent and that said Letters Patent is hereby corrected as shown below:

On the Title Page

Column 2, under Other Publications, Line 3, delete "Managing=IMAP" and insert
-- Managing+IMAP --, therefor.

In the Specification

In Column 1, Line 12, delete "Sep. 25, 2012," and insert -- Sep. 29, 2012, --, therefor.

In the Claims

In Column 8, Line 61, in Claim 1, delete "web," and insert -- web --, therefor.

In Column 9, Line 6, in Claim 1, delete "in, the" and insert -- in the --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*